Aug. 19, 1952      H. W. BRYANT      2,607,859

TELEPHONE TRANSMITTER

Filed Dec. 1, 1950

INVENTOR
H. W. BRYANT
BY

ATTORNEY

Patented Aug. 19, 1952

2,607,859

UNITED STATES PATENT OFFICE 2,607,859

TELEPHONE TRANSMITTER

Herbert W. Bryant, Chatham, N. J., assignor to Bell Telephone Laboratories, Incorporated, New York, N. Y., a corporation of New York Application December 1, 1950, Serial No. 198,619

2 Claims. (Cl. 179—124)

This invention relates to telephone transmitters and more particularly to carbon granule transmitters of the type disclosed in the application Serial No. 783,324, filed October 31, 1947 of H. W. Bryant now Patent 2,532,694, granted December 5, 1950.

In general, a carbon granule transmitter unit is composed of a chamber containing carbon granules, the chamber being defined in part by a pair of electrodes, one of which is fixed and the other of which is free to move with a diaphragm in accordance with sound waves effective thereon. The functioning of such units is dependent on the variation of the resistance of the current path through the carbon granules in accordance with the vibrations of the diaphragm.

The performance characteristics of such transmitters depend upon among other things the shape and spacing of the electrodes and the relative position of the instrument with respect to the gravitational field to which the instrument is subjected.

In some telephone systems, it is important that the agitated or talking resistance of a transmitter be uniform with respect to the space orientation of the instrument, especially where automatic line length equalizers which depend upon the current in the circuit are employed. Also, it is desirable that the maximum resistance to which a transmitter can be shaken or shocked under normal usage be minimized, since the maintenance of the switchboard lamp light and the maximum distance to which a subscriber installation can be reached depend upon, among other things, the total circuit resistance of which the transmitter resistance is a part. Thus, a substantial reduction in the maximum transmitter resistance permits a longer extension of the transmission line from a signalling standpoint. A minimization of the increase in this resistance inherent in the usage and aging the instrument is obviously advantageous.

One object of this invention is to improve the performance characteristics of transmitters of the carbon granule type. More specifically one object of this invention is to minimize the effect of a variation in the angular position of the transmitter with respect to the gravitational field to which the instrument is subjected upon the performance characteristics of the transmitter.

Another object of this invention is to reduce the rate of increase of transmitter resistance with aging and usage.

In one illustrative embodiment of this invention, a carbon granule transmitter is composed of a chamber defined in part by two coaxial dished electrodes, one fixed, referred to hereinafter as the fixed electrode, and the other, which has a substantially hemispherical convex surface, coupled to a diaphragm to vibrate therewith, referred to hereinafter as the vibratile electrode.

In accordance with one feature of this invention, the surface of the fixed electrode has a frusto-conical portion similar to that in the device disclosed in the application hereinabove and an annular portion, specifically, a portion generated by rotating a quarter circle about an axis, at the larger base of the frusto-conical portion. The annular portion improves the positional performance characteristics of the instrument.

The invention and the above-noted and other features thereof will be understood more clearly and fully from the following detailed description with reference to the accompanying drawing in which.

Figure 1:
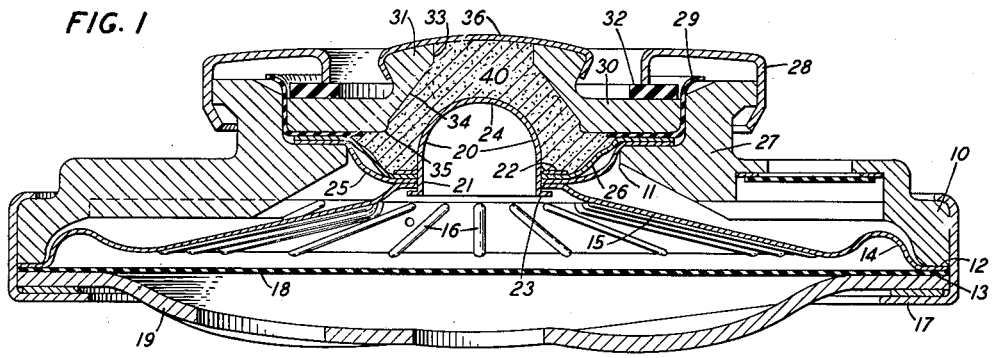
Fig. 1 is an elevational view in section of a transmitter illustrative of one embodiment of this invention.
Figure 2:
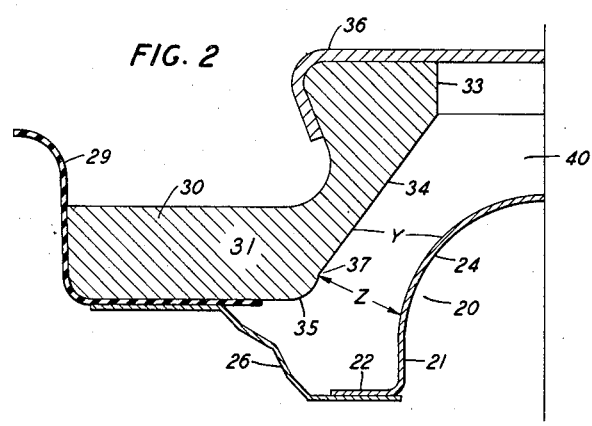
Fig. 2 is a fragmentary, sectional elevational view of the transmitter of Fig. 1.
Figure 3:
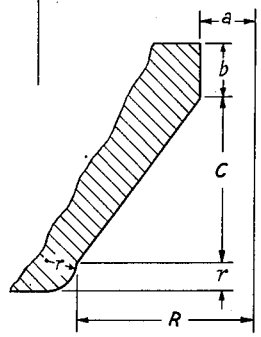
Fig. 3 is a fragmentary sectional view of the fixed electrode of the transmitter of Fig. 1.

Referring now to the drawing, the transmitter of Figs. 1, 2, and 3 comprises a foundation member or frame 10, e. g., of metal, having an internal cylindrical portion 11 and a flat face 12 against which the peripheral portion 13 of the diaphragm is seated. In addition to the peripheral portion 13, the diaphragm includes an annular portion 14 and a frusto-conical central portion 15 which is provided with reinforcing corrugations or flutes 16. Seated on the peripheral portion 13 of the diaphragm and secured to the frame 10 by the clamping band 17 are a moisture resistant screen or membrane 18 and a multiapertured protective cap or cover 19.

An electrode 20, having a cylindrical portion 21, a flange 22, tabs 23 and a substantially hemispherical portion 24, is affixed centrally to and vibratile with the diaphragm, the inner edge of the diaphragm being clamped, with a metallic spider 25, and an annular flexible closure member 26, between the flange 22 and the tabs 23. The arms of the spider 25 extend to and make contact with a flange portion 27 of the frame 10, thus providing electrical contact for the vibratile electrode 20. Seated on the flange 27 held in a pile-up relation by the clamping band 28 are the flexible closure member 26, the spider 25, a cup-shaped insulating member 29, the peripheral flange portion 30 of the fixed electrode 31, and an insulating washer 32.

In addition to the peripheral flange portion 30, the inner surface of the fixed electrode 31 comprises the bounding wall of a cylindrical aperture 33, a frusto-conical portion 34 and an annular portion 35. The annular portion, particularly advantageously, is a surface generated by revolving a quarter circle, one bounding radius of which is parallel to the axis of symmetry of the fixed electrode, about the axis of the fixed electrode, the quarter circle and the axis both lying in the same plane. With reference to Fig. 3, the dimensions of the inner surface of one specific embodiment of this invention are:

$R = 0.177$ inch
$r = 0.020$ inch
$a = .085R$ inch
$b = .04R$ inch
$c = .120$ inch After the chamber 40, bounded by the vibratile electrode 20, the flexible closure member 26, and the fixed electrode 31, is filled through the cylindrical aperture 33 with carbon granules or other comminuted resistance varying material a cap 36 is crimped over the fixed electrode 31.

Figure 4:
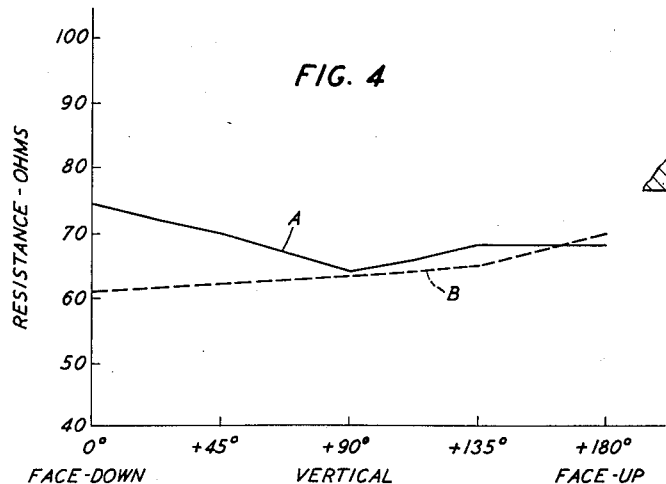
Fig. 4 is a graph comparing the talking resistance as a function of space orientation of the transmitter of Fig. 1 with a typical prior art transmitter.

When a transmitter is held in the face down position as shown in Fig. 1 the earth's gravitational field tends to pull the carbon granules or other comminuted resistance varying material away from the fixed electrode and the talking resistance of a transmitter, such as the one disclosed in the heretofore identified application, increases as is shown by curve A in Fig. 4. In accordance with a feature of the present invention, the carbon granules or other comminuted resistance varying material is intercepted in its attempt to flow out of the interelectrode region, Y by "falling" against the substantially vertical portion 37 of the annular portion 35 of the fixed electrode 31, whereby the contact pressure of the carbon granules or comminuted resistance varying material in the region Z is increased. This results in a decrease in the talking resistance in the face down position as is shown by curve B in Fig. 4.

As shown in Fig. 4, there is a reduction in the average talking resistance of the transmitter due to the increased fixed electrode area. It was also observed that the initial signaling resistance of the transmitter of this invention is substantially eighteen per cent (18%) lower than the initial signaling resistance of the transmitter disclosed in the aforeidentified application.

It has been found that with the fixed electrode contour of the present invention, the increase in the maximum unagitated transmitter resistance due to aging and usage is substantially reduced. Under conditions simulating extensive use in service, the resistance of the transmitter disclosed in the application aboveidentified increased essentially fifty-nine per cent (59%), while the resistance of a transmitter constructed in accordance with the present invention increased only forty per cent (40%) when subjected to the same conditions.

Figure 5:
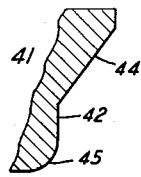
Fig. 5 is a fragmentary, sectional, elevational view of a transmitter illustrative of another embodiment of this invention.

In another embodiment of the present invention the back electrode 41, shown in Fig. 5, includes a cylindrical portion 42, interjacent the frusto-conical portion 44 and the annular portion 45.

Although specific embodiments of this invention have been shown and described, it will be understood that they are but illustrative and that various modifications can be made therein without departing from the scope and spirit of the invention as defined by the appended claims.

What is claimed is:

1. A telephone transmitter comprising a fixed and vibratile electrode having juxtaposed dished surfaces, one of which is convex and substantially hemispherical and the other of which is concave and frusto-conical with an annular portion at the larger base of the frusto-conical portion, said annular portion being a surface of revolution the generatrix of which has a portion near the said frusto-conical portion and substantially parallel to the axis thereof, intersects the trace of said frusto-conical portion in a cusp, and is a smooth convex curve, means including said surfaces bounding a chamber, and comminuted resistance varying material in said chamber.

2. A telephone transmitter comprising a fixed electrode and a vibratile electrode having juxtaposed dished surfaces, one of which is convex and substantially hemispherical and the other of which is concave and frusto-conical with an annular portion at the larger base of the frusto-conical portion, said annular portion being a segmentary torus and having a portion essentially parallel to the direction of motion of the vibratile electrode and adjacent the frusto-conical portion, means including said surfaces defining a chamber, and comminuted resistance varying material in said chamber.

HERBERT W. BRYANT.

REFERENCES CITED

The following references are of record in the file of this patent:

UNITED STATES PATENTS

| Number | Name | Date |
|---|---|---|
| 2,225,488 | Stevens | Dec. 17, 1940 |
| 2,532,694 | Bryant | Dec. 5, 1950 |